Oct. 2, 1923.

B. O. FANSLOW

CHECK PROTECTOR

Filed July 24, 1920

Inventor

Benjamin O. Fanslow

By Sturtivant Duncan

Attorneys

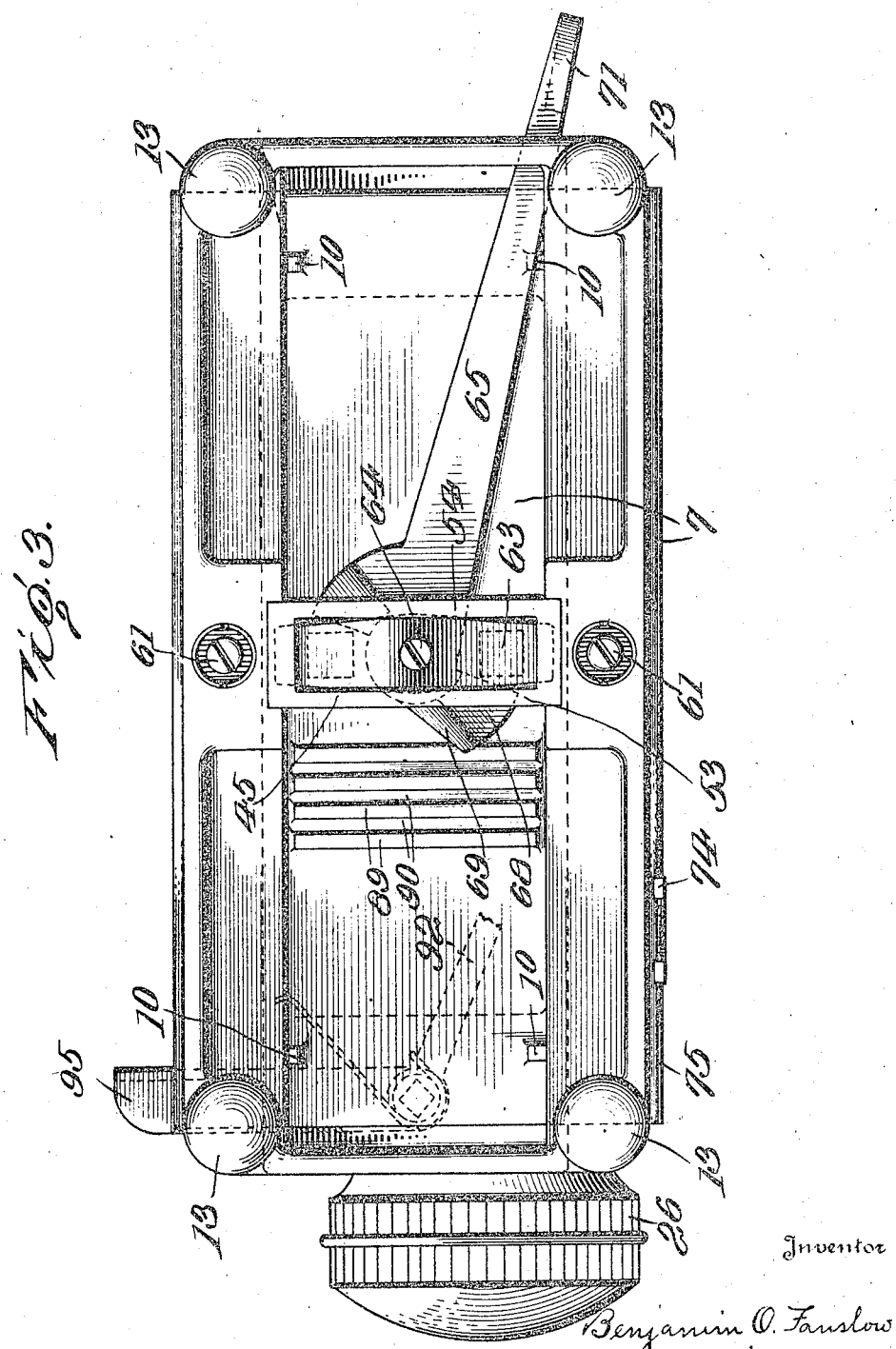

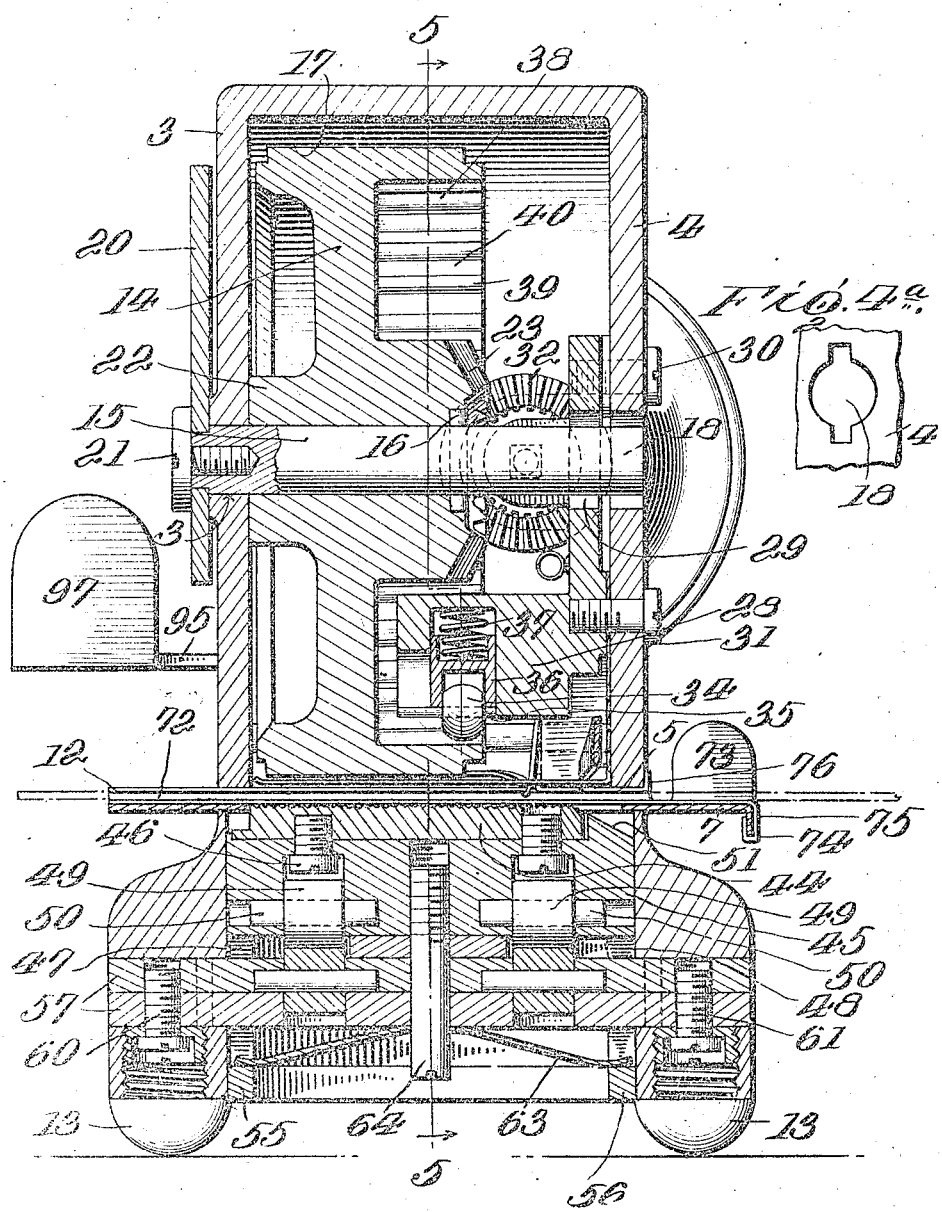

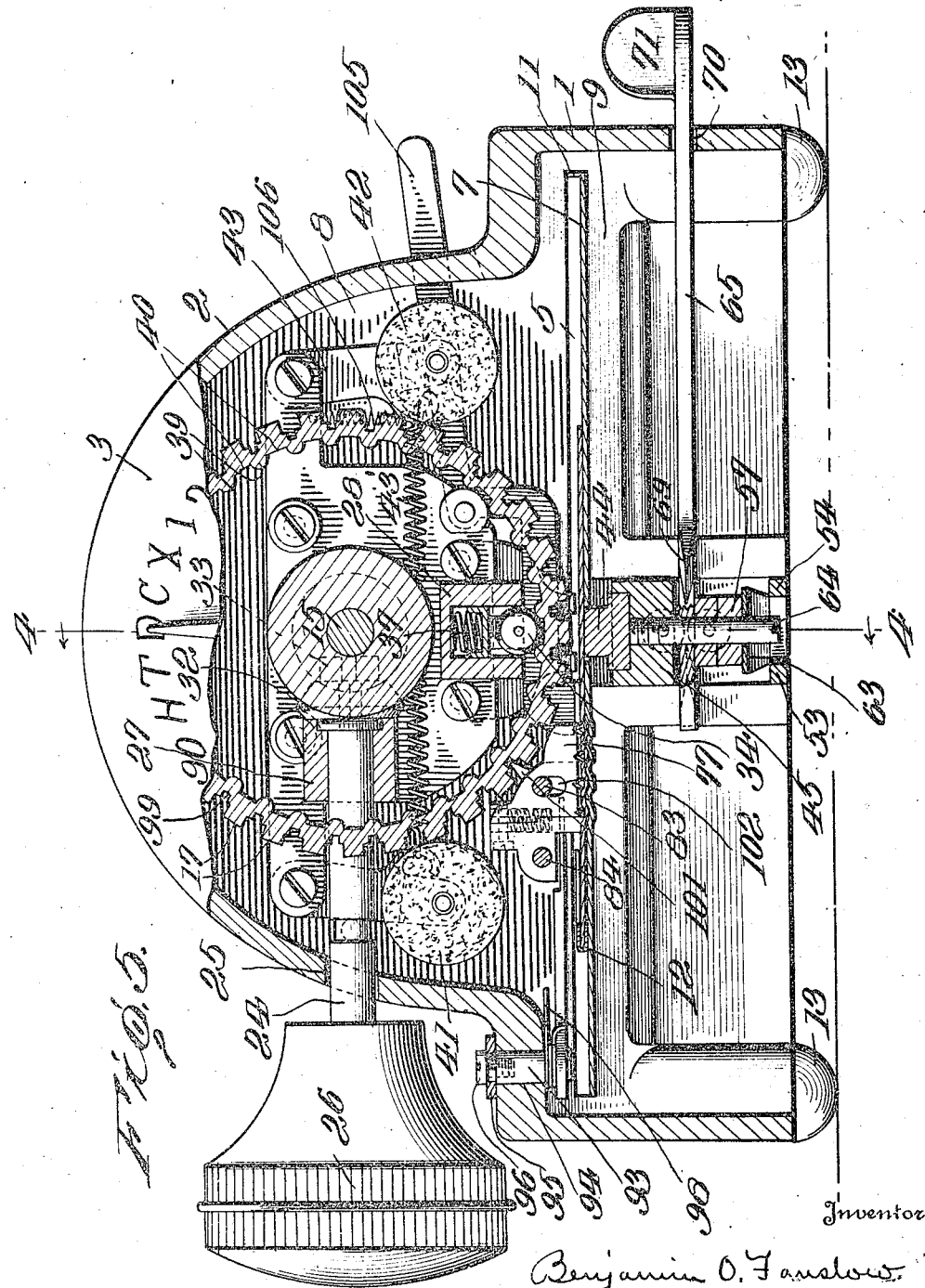

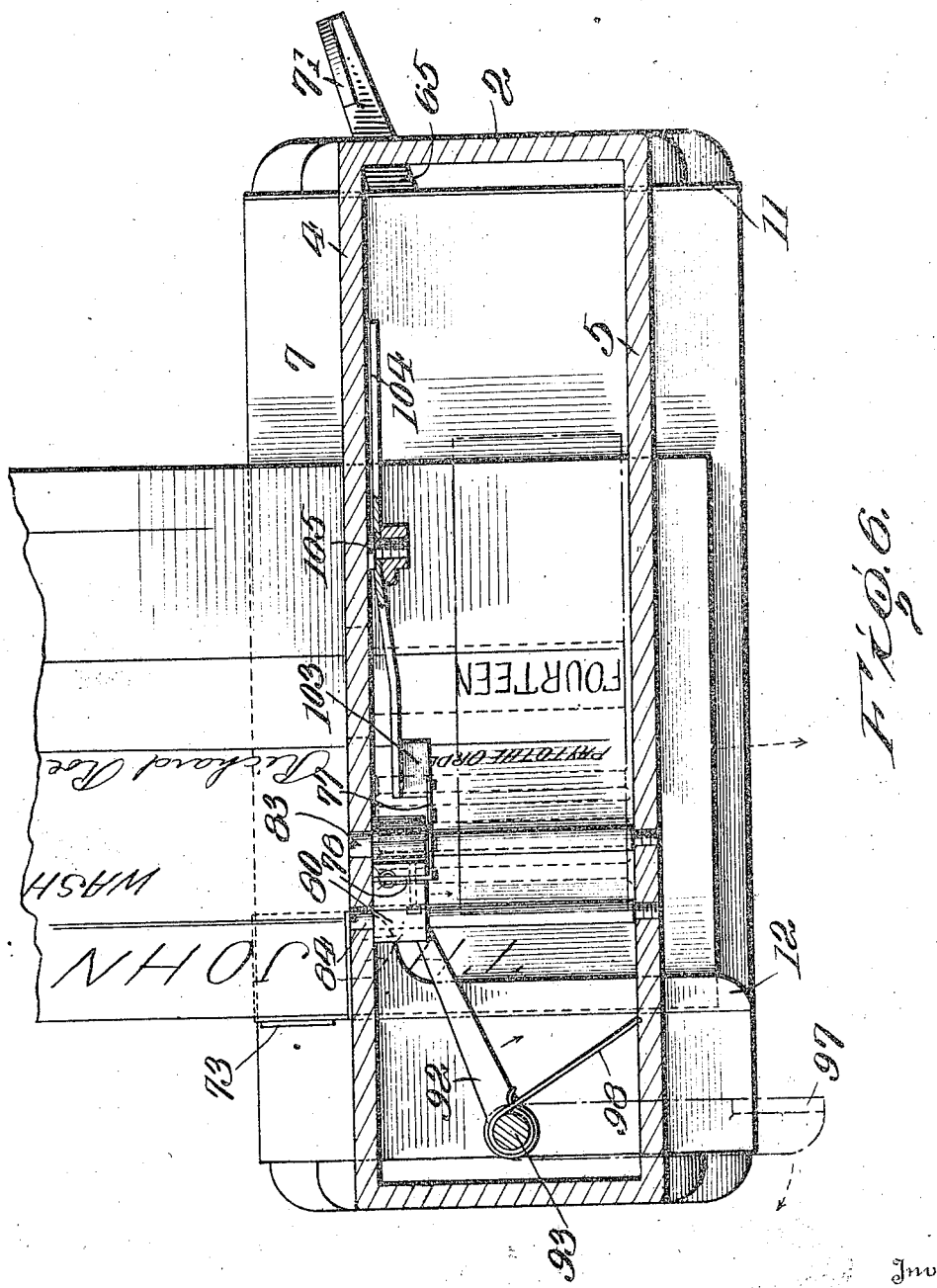

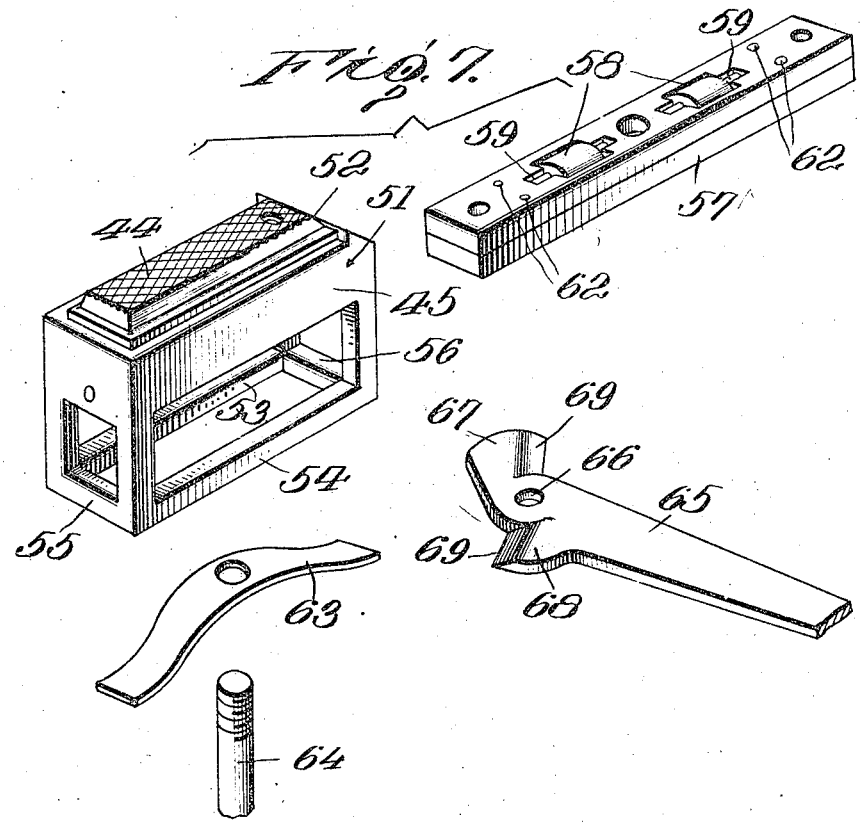
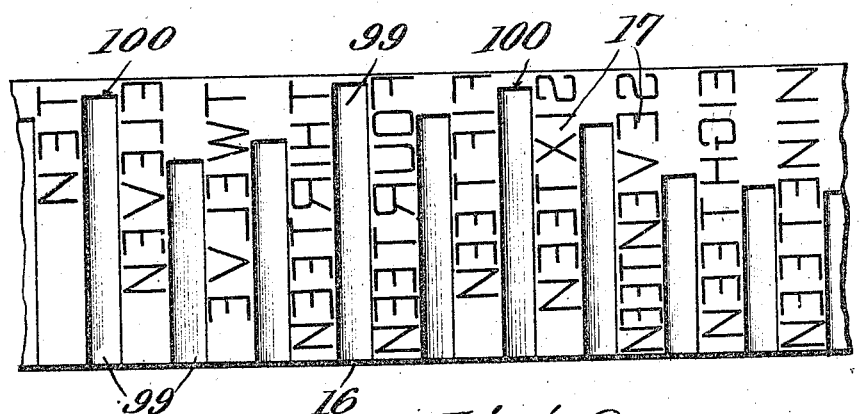

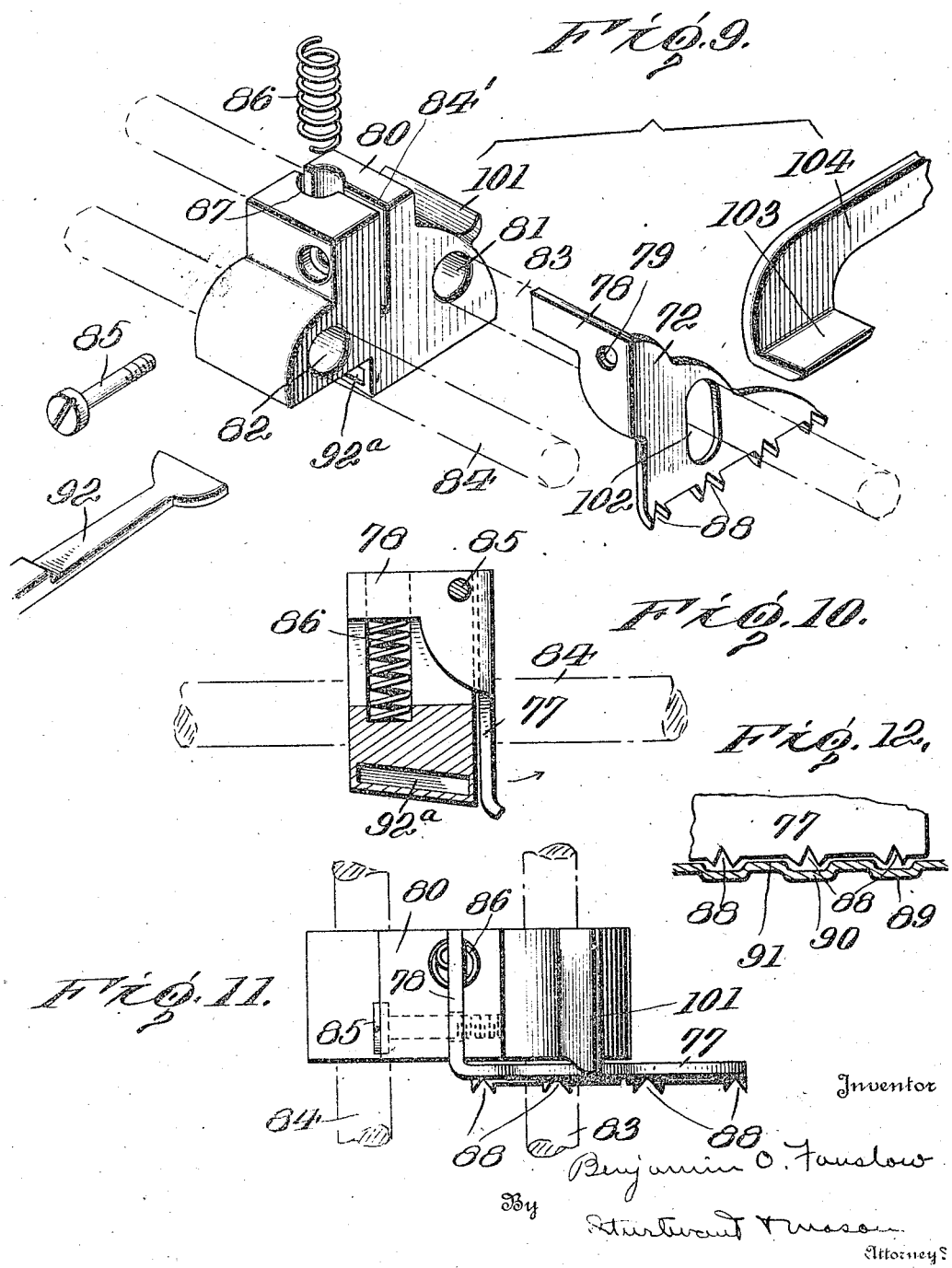

Patented Oct. 2, 1923.

1,469,634

UNITED STATES PATENT OFFICE.

BENJAMIN O. FANSLOW, OF NEW YORK, N. Y., ASSIGNOR TO NEW ERA MFG. COMPANY, OF NEW YORK, N. Y., A CORPORATION OF NEW YORK.

CHECK PROTECTOR.

Application filed July 24, 1920. Serial No. 398,652.

*To all whom it may concern:*

Be it known that I, BENJAMIN O. FANSLOW, a citizen of the United States, residing at New York city, State of New York, have invented certain new and useful Improvements in Check Protectors, of which the following is a description, reference being had to the accompanying drawing, and to the figures of reference marked thereon.

The invention relates to new and useful improvements in check protectors, and more particularly to a check protector which is adapted to mark or print checks, notes and the like in such manner as to prevent any possible changing of the same without detection.

An object of the invention is to provide a check protector which shall consist of a few parts, is simple in construction and which may be quickly manipulated for printing or marking a check.

A further object of the invention is to provide a check protector of the above character, wherein all the main parts are located within a single cast casing.

A still further object of the invention is to provide a check protector wherein the printing wheel, carrying the lines of printing type, is mounted to rotate about a fixed axis and the check to be marked is brought into printing contact therewith by a bodily and vertically moving platen.

A still further object of the invention is to provide a check protector of the above character with yielding means for holding the printing wheel in printing position.

A still further object of the invention is to provide a check protector of the above character with a reciprocating feed dog which is moved by the hand of the operator for feeding the check and wherein the extent of movement of the feed dog is determined by a stop shoulder carried directly by the printing wheel.

A still further object of the invention is to provide a check protector of the above type with a pressure member bearing on the check in rear of the reciprocating feeding member so as to insure the check feeding straight through the machine.

These and other objects will in part be obvious and will in part be hereinafter more fully disclosed.

In the drawings which show by way of illustration one embodiment of the invention—

Figure 3 is a bottom plan view of the same;

Figure 4 is a vertical sectional view on the line 4—4 of Figure 5;

Figure 1:
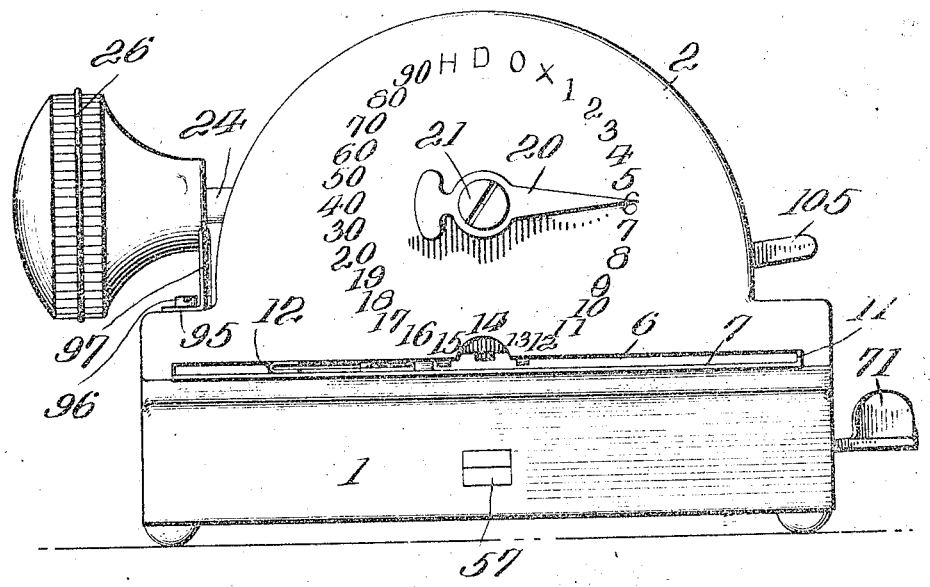
Figure 1 is a front view of my improved check protector.
Figure 2:
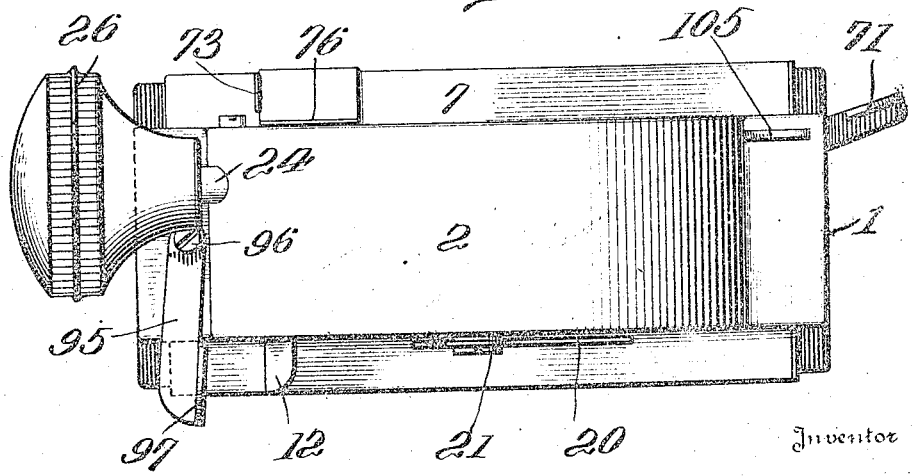
Figure 2 is a top plan view of the same.

Figure 4ª is a rear view of a portion of the casing, showing the support for the shaft for the printing wheel;

Figure 5 is a view partly in front elevation and partly in longitudinal section on the line 5—5 of Figure 4;

Figure 6 is a horizontal sectional view through the check protector, showing the feeding mechanism in plan view and also the presser device associated therewith;

Figure 7 is a detail in perspective showing the platen and the means for raising and lowering the same, the parts being separated to more clearly show their structure;

Figure 8 is a plan view of a development of a portion of the printing wheel, the type being shown diagrammatically;

Figure 9 is a detail in perspective showing the feed dog supporting means, the parts being separated to show the structure and also showing a part of the presser member;

Figure 10 is a detail partly in side elevation and partly in section, showing the feed dog and the support therefor;

Figure 11 is a plan view of the same;

Figure 12 is an enlarged detail showing a portion of the feed dog and a portion of the co-operating supporting plate for the dog.

*General structure.*

My improved check protector consists generally of a single integral casing having slots formed therein through which the check passes during the printing operation. This casing is divided by a supporting plate into upper and lower chambers and in the upper chamber is the printing wheel, mounted to rotate about a fixed axis and associated with the printing wheel are suitable inking rollers. The printing wheel is provided with lines of characters extending parallel with the axis of the printing wheel and the length of the several lines is determined by the character of the word to be printed. The printing wheel is rotated by a hand wheel to position the selected line for printing and is held in printing position by a yielding device cooperating with spaced ribs on the interior of the printing wheel. The check is raised into contact with the printing wheel by a bodily and vertical moving platen. This platen is raised and lowered by a hand lever, said hand lever operating to positively raise the platen and a spring operating to lower the platen as the lever is returned to normal idle position. The check is fed through the machine by a reciprocating feed dog which is provided with teeth adapted to engage the check and feed it forward. Said feed dog is yieldingly held in contact with the check and is reciprocated by a hand lever. The feeding movements are limited by means of stop shoulders formed on the printing wheel directly and engaged by a lug on the support for the feed dog. The check is directed through the machine by a suitable guide and a presser member bearing on the check in rear of the feed dog insures that the feed dog will feed the check in a forward direction and produce a straight line of printing.

The preferred details of construction of my improved check protector will now be described.

Casing.

One of the features of my present invention is to produce a check protector which is of simple construction and of few parts and which can be very cheaply made and at the same time shall be durable and efficient and quickly operated. To this end, I have provided a single cast casing in which all the parts are packed. Said casing consists of a rectangular base portion 1 and a semi-cylindrical housing 2 having parallel front and rear walls 3 and 4. The casing is provided with a horizontal slot 5 at the rear face thereof, and a horizontal slot 6 at the front face thereof and the check to be printed is fed through these slots. Said casing is divided by means of a supporting plate 7 into an upper chamber 8 and a lower chamber 9. Said plate 7 extends through the slots and projects from the casing at each side thereof. The plate is indented at 10—10 to form metal lugs which engage against the inner wall of the casing and this holds the plate in place. Said plate is held against the bottom of the slots by means of an upturned edge 11 at one side thereof, and by means of a U-shaped guide 12 which is located adjacent the other side of the plate. This guide is adjustable and will be described later. The casing is supported by rubber pads 13, one being located at each corner of the casing.

Printing wheel and operating mechanism therefor.

The printing wheel indicated at 14 in the drawings is located in the upper chamber 8 and is secured to a shaft 15. Said printing wheel is formed with recesses adapted to receive the ends of a pin 16 which extend through the shaft and thus the printing wheel is coupled to the shaft so as to turn therewith. This printing wheel is provided with a series of lines of characters 17 (see Figure 8), which, in the present embodiment of my invention, are letters and these letters form words which may be used to print the value of the check. The length of the lines of type is, of course, determined by the length of the word. Each word begins at the same distance from the front edge of the wheel and, of course, the other ends of the lines of type are a variable distance from the other edge of the printing wheel. The shaft 15 extends through a suitable opening 18 in the wall 4 of the casing and through an opening 19 in the front wall of the casing. The opening 18 is provided with radial slots so that the shaft with the pin 16 in place may be inserted through said opening.

The pointer associated with the printing wheel is indicated at 20 and said pointer is secured to the shaft 15 by means of a screw 21. When the pointer is rigidly secured to the shaft it serves as a means for holding the shaft in place while the pin 16 seated in the recesses in the printing wheel. The printing wheel is provided with a hub 22, which runs close to the front wall 3 of the casing. Rigidly secured to the printing wheel is a beveled gear 23. A cross shaft 24 extends through a suitable opening 25 in the wall of the casing and is provided with a hand knob 26 at its outer end whereby said shaft may be readily rotated. Said shaft is mounted in a suitable bearing 27 in a bracket 28. This bracket 28 is also provided with an opening 29 through which the shaft 15 extends and said bracket is secured to the casing at the inner face of the wall 4 by means of screws 30 and 31. The shaft 24 carries a beveled gear wheel 32. This beveled gear wheel 32 meshes with the beveled gear wheel 23. The end of the shaft 24 is square in cross section and fits into a similarly shaped opening in the gear wheel 32 and the gear wheel is held on the shaft by means of a nut 33. When the knob 26 is rotated the printing wheel will be rotated to bring a selected line of type to printing position.

The printing wheel is held yieldingly in printing position by means of a ball roller 34. Said ball roller 34 is provided with an axle 35 which fits in a groove formed in a support 36. Said support 36 slides vertically in a recess in the bracket 28. A spring 37 normally forces the ball roller outwardly away from the center of the shaft 15. Said printing wheel is provided with a cylindrical recess 38 in its rear face and this recess forms a cylindrical wall. Said cylindrical wall is provided with a series of rounded parallel ribs 39 and between adjacent ribs there is a recess 40. The ball roller 34 will readily run over these rounded ribs, dropping into the recesses in succession. When pressure is applied to the hand knob 26, the printing wheel will be turned, said ball roller yielding and rolling over the rounded ribs. If the knob be released with the ball roller on a rounded rib, the spring pressure back of the ball roller will cause the printing wheel to turn until said roller is seated in one of the recesses 40. When said roller is properly seated in the recess, then a line of type is in position for printing.

The particular line of type which is in position for printing is indicated by the pointer 20, which co-operates with a dial consisting of suitable characters, indicating the particular line of type positioned for printing. These characters in the present form of my invention are formed directly on the casing, thus doing away with a dial plate.

The printing wheel in my preferred form of invention is of the type for printing an inked line, and associated with the printing wheel are two inking rollers 41 and 42. These inking rollers are carried by depending swinging arms 43, one on each side of the printing wheel and said arms are mounted on the bracket 28. A spring 43' connected to the arms yieldingly forces the inking rollers into contact with the type.

From the above, it will be apparent that the inking rollers, the yielding device for holding the printing wheel in a given position, and the bearing for the cross shaft are all carried by the single bracket 28. This bracket with all the parts in place, except the cross shaft, are properly positioned relative to the printing wheel, and the printing wheel and bracket slip into the casing from below as a unit, then the cross shaft is slipped in place through the opening 25 in the casing and the shaft 15 slipped in place through the opening 18 in the casing, and the bracket secured in place by the holding screws 30 and 31. After these parts have been assembled, then the bottom plate 7 is placed. This provides a very simple structure which can be readily assembled and placed in a single integral casing.

*Platen and operating mechanism therefor.*

The check is raised into contact with the printing wheel for printing by means of a platen 44. Said platen is roughened or provided with a series of projections which serve not only to raise the check into printing engagement with the printing wheel, but to mutilate the portion of the check which is printed. The types are similarly roughened or formed with projections to co-operate with the projections in the platen in mutilating the paper. This platen is mounted so as to move bodily and vertically and lift with equal pressure the entire surface of the check which is to be printed. The platen is secured to a carriage 45 therefor by means of screws 46—46. This carriage 45 is adapted to slide vertically in guide-ways 47 and 48 formed in the casing. The carriage is provided with recesses in which rollers 49 are located and these rollers are held in place by means of removable pintles 50. The openings in the carriage for the pintles are at the ends of the carriage and these ends are closed by the wall of the guiding recess so that the pintles can not be dislodged from the rollers.

As clearly shown in Figure 4 of the drawings, the carriage 45 is provided with a beveled end 51 at the side of the casing, into which the check is introduced which insures that the check will move over the top of the platen. The platen is also beveled as indicated at 52, at the end adjacent the beveled edge 51. As clearly shown in Figure 7, the carriage 45 has an extension consisting of side members 53 and 54 and end members 55 and 56, with suitable corner parts which support these side and end members. Extending through suitable opening in the base is a cross bar 57 which is provided with recesses in which rollers 58—58 are located. Said rollers are supported by pintles 59, likewise seated in recesses in this cross bar so that the upper edges of the rollers project slightly above the cross bars. This cross bar extends through the openings in the ends of the carriage above the end members 55 and 56, as clearly shown in Figure 4 of the drawings. The cross bar is held in place by screws 60 and 61. The cross bar 57 is formed of two plates riveted together by suitable rivets 62, see Figure 7. A spring 63 bears at its opposite ends upon the members 55 and 56, respectively, and at the middle portion bears against the underface of the cross bar 57. This spring operates to force the carriage to its extreme lowered position. A pivot pin 64 extends up through the cross bar and is threaded into the carriage. Said pin slides freely in the cross bar. Mounted on this pivot pin is a lever 65, see Figure 7, which lever is provided with an opening 66 to receive the pin 64. Said lever has radially extending projections 67 and 68, each of which is formed with a cam shoulder 69. These cam shoulders, which are in the form of knife blades, are adapted to move between the rollers carried by the carriage and by the cross bar and thus positively force the carriage upwardly against the tension of the spring 63. Thus it is that the carriage may be positively raised to bring the check into printing contact with the lines of type upon the printing wheel, and when the lever 65 is released the rollers bearing against the cam inclines will force the carriage to return to its normal lowermost position. The lever 65 extends out through a suitable opening 70 in the base of the check protector and is provided with an upturned portion 71 which may be readily grasped for moving the lever.

Feeding and guiding mechanism.

The guiding member 12, as above noted, consists of a strip of metal folded upon itself to form a guiding recess 72. The check to be printed is inserted in the slot 5 in the rear of the machine and with one edge of the check in this guiding recess of the guide 12. The guide 12 is frictionally held in place and may be moved toward or from the center of the machine or the line of printing and thus the line of printing on the check properly positioned. This guiding member, as above noted, serves the double function of holding the bottom plate in place and guiding the check. Said guiding member 12 is formed with an upwardly extending finger piece 73, by which it may be readily shifted and is also bent downwardly and inwardly, as indicated at 74 around the downturned edge 75 of the bottom plate 7. The upper wall of the guiding member 12 is also bent upwardly, as at 76, so as to insure that the check will be inserted within the guiding recess 72. The check is fed through the machine by means of a feed dog 77. This feed dog and the supporting means therefor is shown in detail in Figures 9 and 11. The feed dog is in the form of a plate having a shank 78 as right angles to the main portion of the feed dog, which shank is provided with an opening 79. The feed dog is carried by a feed dog support 80 which is formed with openings 81 and 82, adapted to freely engage rods 83 and 84, respectively, shown in dotted lines in Figure 9. The support slides back and forth on these rods and the rods are secured in the end walls of the casing. Said support 80 is provided with a vertical recess 84', which receives the shank 78 of the feed dog and a screw 85 passing through the opening 79 serves as a pivot, so that the feed dog may swing freely on said support. A spring 86 located in a recess 87 bears against the underface of the shank 78 in rear of the screw 85, as clearly shown in Figure 10, and normally moves the main section of the feed dog 77 against the support. The feed dog is provided with teeth 88 which are adapted to grip the paper or check for feeding the same through the machine.

As clearly shown in Figure 12, the bottom plate 7 is provided with a series of indented recesses 89 and the teeth 88 in the feed dog are adapted to work in these recesses. The portions of the feed dog 90, between adjacent teeth, bear on the ribs 91 in the bottom plate 7, which ribs are formed by these indented recesses 89. In other words, the bottom plate has longitudinally extending grooves and recesses directly beneath the teeth of the feed dog, so that when there is no check in the machine, a portion of the feed dog between the teeth, rides on the bottom plate while the teeth are free to run in the recesses. This not only enables the feed dog teeth to bend and better grip the paper of the check, but it prevents said teeth from being dulled by having direct sliding contact on the metal bottom plate, as would otherwise be the condition.

The support 80 for the feed dog is moved back and forth on the rods 83 and 84 by means of an arm 92. The arm 92 extends into a recess 92ª in the support 80 and has shoulders on its free end engaging the end of the recess for moving said support. This arm 92, as clearly shown in Figures 5 and 6, is rigidly carried by a vertical post 93, which is located in a recess 94. Rigidly secured to the upper end of this post 93 is an arm 95. Said arm is secured to the post by a screw 96. The arm 95 projects to the front of the machine and is provided with a thumb piece 97. Surrounding the post 93 is a spring 98. This spring at one end bears against the arm 92 and at its other end it engages an opening in the front wall of the casing. The spring normally tends to move the arm to the rear of the machine, while the operator pressing upon the thumb piece 97 swings the lever so as to move the feed dog support toward the front of the machine for the feeding of the check. When the feed dog is released, it returns to its normal position, shown in Figure 6. That is, with the feed dog support against the rear wall of the casing.

The extent of the forward movement of the feed dog and thus the extent of feed of the check is determined by a series of stops formed directly on the printing wheel. As clearly shown in Figure 8, the surface of the printing wheel is formed with a series of grooves 99. These grooves are located between the lines of type. Each groove extends from the rear of the printing wheel along the surface to a varying extent and at the inner end of each groove there is a stop shoulder 100. The feed dog support 80 is provided with a rib 101, which is adapted to enter one of these grooves 99 when the printing wheel is in position for printing and slide therein until it strikes the stop shoulder at the extreme end of the groove 99. When this rib strikes the stop shoulder at the end of the groove, the feed dog can not be moved further and, therefore, the stroke of the feed dog is determined by these stop shoulders 100. These grooves are so proportioned and the stop shoulders so positioned that when the word "Fifteen" for example, is in position for printing, the groove which the rib 101 enters is just the right length for a feed of the check, the length of the type forming the word "Fifteen" plus the spacing between the word printed and the next word to be printed.

From the above, it will be apparent that I have provided a feeding mechanism which includes a reciprocating feed dog which is moved by hand for feeding the check and wherein the mechanism is very simple and wherein the length of the feed stroke is determined by the length of the word which is printed plus the desired space between the printed words on the check.

The feed dog 77 is provided with a vertical opening 102 which permits the feed dog to swing freely. Located in rear of the feed dog is a presser foot or member 103 carried by a lever 104. This lever is pivoted at 105 and extends outwardly through a suitable slot in the casing. The extreme outward end 105 may be readily depressed by the operator and the presser foot raised from the check. A spring 106 is secured to this lever 104 at the right of its pivot point and serves normally to hold the end yieldingly in contact with the check. This lever 104 is pivoted to the bracket 28 and is removed or placed in the casing with the bracket. The presser foot 103 is directly in rear of the feed dog and when the feed dog is retracted, said presser foot engages the dog, swings it on its pivot and moves it clear of the check beneath the same, so that when the feed dog is at its extreme rear position, a check may be readily inserted in the machine after the presser foot is raised, the raising of the presser foot raising the feed dog to a further degree. When the feed dog moves forward, the presser foot places a slight frictional drag on the check and this insures the direct forward movement of the check through the operation of the feed dog.

*Operation.*

From the above, it is thought that the operation of my check protector will be apparent. The check is now inserted in the machine from the rear through the slots in the casing, with one edge in the guiding recess 72. The presser foot is raised to permit the insertion of the check. After it has been placed in the machine, then the printing wheel is turned through the hand knob 26 to bring the pointer to the character indicating the desired word to be printed upon the check, after which the lever 65 is swung which raises the platen bodily, lifting the check against the type on the printing wheel and the word is printed. During this operation the printing wheel is held in printing position by the yielding ball roller engaging the printing wheel between the rounded ribs thereon. After the word has been printed, the lever 65 is released and the spring returns the platen to its normal lowered position. The operator then presses upon the thumb piece 97 which causes the feed dog support to move forward, the feed dog grips the check and moves the check forward and the forward movement of the feed dog is limited by the stop shoulder which is associated with the particular line of type printing, and, therefore, the check will be fed a distance equal to the length of the line of type plus the desired space between words. The lever for manipulating the feed dog support is released and the feed dog returns to its normal position for the next feeding stroke. The printing wheel is then set for the next desired word to print and this cycle of operations is continued until the entire check is printed, after which the check may be withdrawn.

While I have shown one specific form of the invention, it will be understood, of course, that changes may be made in the details of construction and arrangement of parts without departing from the spirit of the invention, as set forth in the appended claims.

Having thus described my invention, what I claim as new and desire to secure by Letters Patent, is:

1. A check protector comprising a casing, a printing wheel mounted in said casing to rotate about a fixed axis, a platen, a vertically reciprocating carriage carrying the platen and moving in guiding recesses in said casing, a cross bar fixed to the casing, a swinging lever disposed between the cross bar and the carriage and having means for raising the carriage and platen to print the check.

2. A check protector comprising a casing, a printing wheel mounted in said casing to rotate about a fixed axis, a platen, a vertically reciprocating carriage moving in guiding recesses in said casing, a cross bar fixed to the casing, a vertically disposed pivot pin, a lever free to move on said pin having inclined portions movable between the carriage and cross bar for raising the platen to print the check, and a spring for lowering the carriage.

3. A check protector comprising a casing, a printing wheel mounted in said casing to rotate about a fixed axis, a platen, a vertically reciprocating carriage on which said platen is mounted, rollers carried by said carriage, a cross bar mounted in said casing, rollers carried by said cross bar, a pivot pin, and a lever free to move on said pivot pin and having inclined cam faces adapted to move between the respective rollers on the carriage and cross bar for raising the carriage.

4. A check protector comprising a casing, a printing wheel mounted in said casing to rotate about a fixed axis, a platen, a vertically reciprocating carriage on which said platen is mounted, rollers carried by said carriage, a cross bar mounted in said casing, rollers carried by said cross bar, a pivot pin, a lever free to move on said pivot pin and having inclined cam faces adapted to move between the respective rollers on the carriage and cross bar for raising the carriage, and a flat bowed spring engaging the underface of said cross bar and engaging said carriage for lowering the carriage.

5. A check protector comprising a casing, a printing wheel mounted in said casing to rotate about a fixed axis, a platen, a carriage on which said platen is mounted, said carriage having rollers and parts extending beneath said rollers, a pivot pin mounted in said carriage, a cross bar mounted in the casing and having an opening through which said pivot pin freely slides, rollers mounted in recesses in the upper face of said cross bar, said rollers being opposed to the rollers on the carriage, a lever free to swing on said pivot pin, and having an inclined cam face adapted to move between the respective rollers for raising the carriage, a bowed spring having an opening for the pivot pin bearing against the underface of the cross bar and having its ends engaged with the parts of the carriage extending beneath the roller.

6. A check protector comprising a casing having slots in opposed faces thereof, a plate in said slots dividing the casing into upper and lower chambers, a printing wheel mounted in the upper chamber to rotate about a fixed axis, a platen located in said lower chamber, said plate having an opening through which said platen moves, means for raising said platen for printing the check, means independent of the printing wheel and located in the upper chamber for engaging the check to feed the same, and a hand lever for operating said feeding means.

7. A check protector comprising a casing having slots in opposed faces thereof, a plate in said slots dividing the casing into upper and lower chambers, a printing wheel mounted in the upper chamber to rotate about a fixed axis, a platen located in said lower chamber, said plate having an opening through which said platen moves, means for raising said platen for printing the check, a reciprocating feed dog located in said upper chamber for feeding the check, a hand lever for moving said feed dog, and means carried by the printing wheel for limiting the movement of the feed dog.

8. A check protector comprising a casing having slots in opposed faces thereof, a plate in said slots dividing the casing into upper and lower chambers, a printing wheel mounted in the upper chamber to rotate about a fixed axis, a platen located in said lower chamber, said plate having an opening through which said platen moves, means for raising platen for printing the check, a reciprocating feed dog located in said upper chamber for feeding the check, a hand lever for moving said feed dog, means carried by the printing wheel for limiting the movement of the feed dog, and a presser member in rear of the feed dog and bearing against said check during the feeding movement thereof.

9. A check protector comprising a casing having slots in opposed faces thereof, a plate in said slots dividing the casing into upper and lower chambers, a printing wheel mounted in the upper chamber to rotate about a fixed axis, a platen located in said lower chamber, said plate having an opening through which said platen moves, means for raising said platen for printing the check, a reciprocating feed dog located in said upper chamber for feeding the check, a hand lever for moving said feed dog, means carried by the printing wheel for limiting the movement of the feed dog, a presser member in rear of the feed dog and bearing against said check during the feeding movement thereof, and means for raising the presser member and thereby raising the feed dog.

10. A check protector comprising a casing having slots in opposed faces thereof, a plate in said slots dividing the casing into upper and lower chambers, a printing wheel mounted in the upper chamber to rotate about a fixed axis, an operating shaft extending through the casing for rotating said printing wheel, a platen located in said lower chamber and adapted to raise the check for printing the same, a lever extending through the casing for raising said platen, a feeding mechanism independent of the printing wheel located in the upper chamber, and a hand lever extending through the casing for operating said feeding mechanism.

11. A check protector comprising a casing having slots in opposed faces thereof, a plate in said slots dividing the casing into upper and lower chambers, a printing wheel mounted in the upper chamber to rotate about a fixed axis, an operating shaft extending through the casing for rotating said printing wheel, a platen located in said lower chamber and adapted to raise the check for printing the same, a lever extending through the casing for raising said platen, a reciprocating feed dog located in said upper chamber for engaging and feeding the check, and a hand lever for reciprocating the feed dog.

12. A check protector comprising a casing having slots in opposed faces thereof, a plate in said slots dividing the casing into upper and lower chambers, a printing wheel mounted in the upper chamber to rotate about a fixed axis, an operating shaft extending through the casing for rotating said printing wheel, a platen located in said lower chamber and adapted to raise the check for printing the same, a lever extending through the casing for raising said platen, a reciprocating feed dog located in said upper chamber for engaging and feeding the check, a hand lever for reciprocating the feed dog, a presser member engaging the check in rear of the feed dog, and a hand lever extending through the casing by which said presser member may be raised.

13. A check protector comprising a single integral casing having a rectangular base and a semi-cylindrical housing having parallel front and rear walls, slots formed in the front and rear walls of said casing, a plate located in said slots and projecting beyond the side walls of the casing, a printing wheel located in said housing, a platen co-operating with said printing wheel, means for giving a relative movement to said platen and printing wheel for printing the check, means for feeding the check, said plate having one edge thereof turned up for holding the plate against the bottom edges of the slots, and said plate having downwardly projecting lugs engaging the inner faces of the walls of the casing to prevent edgewise movement of the plate.

14. A check protector comprising a single integral casing having a rectangular base and a semi-cylindrical housing having parallel front and rear walls, slots formed in the front and rear walls of said casing, a plate located in said slots and projecting beyond the side walls of the casing, a printing wheel, located in said housing, a platen co-operating with said printing wheel, means for giving a relative movement to said platen and printing wheel for printing the check, means for feeding the check, said plate having one edge thereof turned up for holding the plate against the bottom edges of the slots, said plate having downwardly projecting lugs engaging the inner faces of the walls of the casing to prevent edgewise movement of the plate, and a guide having a recess for guiding the edge of the check connected to said plate so that said guide may be adjusted longitudinally thereof.

15. A check protector comprising a single integral casing having a rectangular base and a semi-cylindrical housing having parallel front and rear walls, slots formed in the front and rear walls of said casing, a plate located in said slots and projecting beyond the side walls of the casing, a printing wheel located in said housing, a platen co-operating with said printing wheel, means for giving a relative movement to said platen and printing wheel for printing the check, means for feeding the check, said plate having one edge thereof turned up for holding the plate against the bottom edges of the slots, said plate having downwardly projecting lugs engaging the inner faces of the walls of the casing to prevent edgewise movement of the plate, a guide having a recess for guiding the edge of the check connected to said plate so that said guide may be adjusted longitudinally thereof, said guide having an upturned lip at the receiving end thereof to insure that the check passes into said guiding recess.

16. A check protector comprising a single integral casing, a printing wheel, a shaft mounted in said casing and carrying said printing wheel, a bracket located in said casing and secured thereto, pivoted arms carried by said bracket, inking rollers mounted on said arms, a spring for yieldingly moving said rollers into contact with the printing wheel, a cross shaft for rotating the printing wheel, said bracket having a bearing for said cross shaft, and a yielding roller mounted on said bracket and engaging said printing wheel for holding the same in a selected printing position.

17. A check protector comprising a single integral casing, a printing wheel, a shaft mounted in said casing and carrying said printing wheel, a bracket located in said casing and secured thereto, pivoted arms carried by said bracket, inking rollers mounted on said arms, a spring for yieldingly moving said rollers into contact with the printing wheel, a cross shaft for rotating the printing wheel, said bracket having a bearing for said cross shaft, and a yielding roller mounted on said bracket and engaging said printing wheel for holding the same in a selected printing position, a reciprocating feed dog for feeding the check, and a presser member mounted on said bracket for engaging said check in rear of the feed dog.

18. A check protector comprising a single integral casing, a printing wheel, a shaft mounted in said casing and carrying said printing wheel, a bracket located in said casing and secured thereto, pivoted arms carried by said bracket, inking rolls mounted on said arms, a spring for yieldingly moving said rollers into contact with the printing wheel, a cross shaft for rotating the printing wheel, said bracket having a bearing for said cross shaft, said bracket having a recess formed therein, a pivoted roller extending into said recess, a spring for forcing said roller outwardly, and said printing wheel having a recess formed therein providing a cylindrical wall, rounded ribs formed on said cylindrical wall with which said yielding roller engages for holding the printing wheel in a selected printing position.

19. A check protector comprising a casing, a printing wheel mounted to rotate upon a fixed axis, a platen cooperating with the printing wheel, means independent of the printing wheel for feeding the check, said printing wheel having a recess therein forming a cylindrical wall, spaced rounded ribs on the inner surface of said cylindrical wall of the printing wheel, a ball roller adapted to engage said rounded ribs, a bracket supporting said roller, and a spring yieldingly forcing the roller into contact with the ribs.

20. A check protector comprising a casing, a printing wheel located therein, a shaft extending through said printing wheel and carrying a projecting pin adapted to engage recesses in the printing wheel for rotating the same, a pointer secured to said shaft for holding the pin in said recesses and connecting the shaft to the printing wheel.

21. A check protector comprising a casing having parallel front and rear walls with a line of openings therein, a printing wheel located in said casing, a shaft extending through said openings and through said printing wheel, a projecting pin carried by the shaft engaging recesses in the rear face of said printing wheel, a pointer secured to the front end of said shaft and holding said pin in said recesses.

22. A check protector comprising a casing having parallel front and rear walls with a line of openings therein, a printing wheel located in said casing, a shaft extending through said openings and through said printing wheel, a projecting pin carried by the shaft engaging recesses in the rear face of said printing wheel, a pointer secured to the front end of said shaft and holding said pin in said recesses, said printing wheel having a beveled gear thereon, a cross shaft extending through said casing and having a hand knob, a beveled gear secured to the other end of said shaft and meshing with said beveled gear on the printing wheel.

23. A check protector comprising a casing, a printing wheel therein, a plate co-operating with said printing wheel, a reciprocating feed dog, a hand lever for reciprocating said feed dog, said printing wheel having on its outer face grooves, each terminating in a stop shoulder, a rib movable with said feed dog and adapted to engage one of said grooves, the groove engaged by said rib being proportioned to the length of the word printed plus the desired space between words.

24. A check protector comprising a casing, a printing wheel located in said casing to rotate about a fixed axis, a platen co-operating with said printing wheel, a yielding feed dog, a support for said feed dog, a lever engaging said support for reciprocating the same, a spring for moving said lever to retract the feed dog, said printing wheel having a series of parallel lines of type, a groove between adjacent lines of types open at the rear of the printing wheel and terminating at a stop shoulder, a rib on said feed dog support adapted to engage one of said grooves for limiting the forward movement of the feed dog, said groove engaged by the rib being proportioned in length to the length of the word printing plus the desired space between words.

25. A check protector comprising a casing having a printing wheel therein, a platen co-operating with the printing wheel, rods extending across said casing, a feed dog support sliding on said rods, a lever engaging said support for moving it back and forth, a spring for moving the lever in one direction, a hand piece for moving the lever in the other direction, a feed dog pivoted to said support and having a rearwardly projecting shank, a spring carried by the support and engaging said shank for normally pressing the feed dog into engagement with the check.

26. A check protector comprising a casing, a printing wheel therein, a platen co-operating with the printing wheel, a feeding mechanism for feeding the check including a feed dog having teeth adapted to engage the check, a plate supporting the check, said plate having grooves directly beneath said feed dog teeth and of greater depth than the length of the teeth.

27. A feeding mechanism for a check protector including a reciprocating pivoted feed dog yieldingly pressed toward the check, a plate for supporting the check having longitudinal grooves formed therein, said feed dog having spaced teeth engaged directly beneath said grooves and having sections between the teeth adapted to ride on the ridges between the grooves in the plate when the feed dog is moved with no check of the machine.

In testimony whereof, I affix my signature.

BENJAMIN O. FANSLOW.